(12) United States Patent
Peruzzi et al.

(10) Patent No.: US 9,113,476 B2
(45) Date of Patent: Aug. 18, 2015

(54) METHOD TO PERFORM A WIRELESS COMMUNICATION IN A DATA COLLECTION SYSTEM

(75) Inventors: Pier Giorgio Peruzzi, Novafeltria (IT); Fabio Maria Albanese, HCMC (VN); Antonio Picciano, Campobasso (IT)

(73) Assignee: DATALOGIC SCANNING GROUP S.R.L., Lippo di Calderara di Reno (BO) (IT)

( * ) Notice: Subject to any disclaimer, the term of this patent is extended or adjusted under 35 U.S.C. 154(b) by 709 days.

(21) Appl. No.: 13/320,104

(22) PCT Filed: May 12, 2009

(86) PCT No.: PCT/IB2009/005568
§ 371 (c)(1),
(2), (4) Date: Nov. 22, 2011

(87) PCT Pub. No.: WO2010/131060
PCT Pub. Date: Nov. 18, 2010

(65) Prior Publication Data
US 2012/0106352 A1    May 3, 2012

(51) Int. Cl.
*H04W 74/08* (2009.01)
(52) U.S. Cl.
CPC ................... *H04W 74/08* (2013.01)
(58) Field of Classification Search
USPC .......... 370/328, 329, 336, 337, 338, 445, 474
See application file for complete search history.

(56) References Cited

U.S. PATENT DOCUMENTS

| | | | | |
|---|---|---|---|---|
| 6,009,104 | A * | 12/1999 | Kalkunte | 370/448 |
| 7,505,405 | B2 * | 3/2009 | Chadha et al. | 370/230 |
| 2004/0004973 | A1 * | 1/2004 | Lee | 370/445 |
| 2005/0030967 | A1 * | 2/2005 | Ohmi et al. | 370/445 |
| 2005/0153735 | A1 | 7/2005 | Morioka et al. | |
| 2005/0220145 | A1 * | 10/2005 | Nishibayashi et al. | 370/474 |
| 2006/0077906 | A1 | 4/2006 | Maegawa et al. | |

(Continued)

FOREIGN PATENT DOCUMENTS

| | | |
|---|---|---|
| EP | 0825730 A2 | 2/1998 |
| EP | 1589704 A2 | 10/2005 |

(Continued)

OTHER PUBLICATIONS

International Search Report and Written Opinion dated Apr. 29, 2010 in corresponding International Application No. PCT/IB2009/005568 (14 pages).

*Primary Examiner* — Habte Mered
*Assistant Examiner* — Prince A Mensah
(74) *Attorney, Agent, or Firm* — Duane Morris LLP (57) ABSTRACT

A method for performing wireless communication in a data-collection system includes a) listening whether a channel is free or busy and if the channel is free, transmitting; b) if the channel is busy, generating a random number and associating therewith a first interval of time to determine the instant of the start of transmission and further whether said channel is busy, identifying a second variable interval of time, monitoring the data exchanged in said channel with other devices that occupy the channel, queuing a third interval of time obtained from said first interval of time onto said second interval of time and transmitting at the end of said third interval of time. The second interval of time has a duration that is equal to the time wherein the channel remains in busy status.

29 Claims, 2 Drawing Sheets

(56) References Cited

U.S. PATENT DOCUMENTS

| | | | |
|---|---|---|---|
| 2007/0053342 A1* | 3/2007 | Sierecki et al. | 370/351 |
| 2007/0254655 A1 | 11/2007 | Tujkovic et al. | |
| 2008/0151849 A1* | 6/2008 | Utsunomiya et al. | 370/338 |
| 2008/0198815 A1* | 8/2008 | Liu | 370/336 |
| 2008/0219364 A1 | 9/2008 | Hui et al. | |
| 2008/0291873 A1* | 11/2008 | Benveniste | 370/329 |
| 2009/0029706 A1 | 1/2009 | Prakash et al. | |
| 2009/0122700 A1* | 5/2009 | Aboba et al. | 370/230 |
| 2010/0142497 A1* | 6/2010 | Kim et al. | 370/337 |
| 2011/0256845 A1* | 10/2011 | Shuster | 455/410 |
| 2012/0155349 A1* | 6/2012 | Bajic et al. | 370/311 |

FOREIGN PATENT DOCUMENTS

| | | |
|---|---|---|
| EP | 1853006 A2 | 11/2007 |
| WO | WO9911081 A2 | 3/1999 |
| WO | WO2008152612 A2 | 12/2008 |

\* cited by examiner

METHOD TO PERFORM A WIRELESS COMMUNICATION IN A DATA COLLECTION SYSTEM

BACKGROUND AND SUMMARY OF THE INVENTION

The invention relates to a method for performing a wireless communication in a data collection system, the system comprising a plurality of devices communicating with one another over a first data network performed by means of a single wireless channel, in which access to said channel is based on a CSMA (English acronym for Carrier Sense Multiple Access) data transmission technique.

In particular, said communication method relates to a communication system in which the devices comprise a plurality of portable data-collection units and at least one base unit, communicating over a radio frequency wireless network.

Data-collection apparatuses are known comprising data-collection units which are able to read optical information, for example barcodes or RFID tags. The data-collection unit can be grasped by an operator and is thus portable. The data-collection apparatus may further comprise a base unit arranged for receiving and supporting the portable data-collection unit when the data-collection unit is not in use, or, alternatively, for communicating with the portable data-collection unit in order to acquire the collected data from said portable unit.

Each portable unit comprises a portable battery-driven data acquisition, and possibly management, device intended for interacting with a base unit for recharging the battery and/or for exchanging data. The portable unit may be a PDT (portable data terminal) i.e. a portable terminal for the automatic or manual acquisition of data, or, in general, a portable automatic identification terminal such as a portable reader of optical information or of coded information stored in a transponder (also called in English a Radio Frequency Identification Device or "RFID tag").

The base unit may comprise a battery-charging device that supplies batteries with which the portable unit is provided. Alternatively, if the battery-charging device is contained in the portable unit, the base unit comprises a supply circuit for the battery charger.

The portable data-collection unit can therefore assume a use configuration in which it is grasped by the user to acquire the optical information or the RFID tags and is communicated over a wireless network with the base unit, and a rest configuration, in which it is received and retained by the base unit so that the batteries can be recharged, if necessary.

Data-collection apparatuses are known, for an industrial environment or for commercial applications, that comprise a data collection system comprising a plurality of portable data-collection units and one or more base units. Each device (whether portable unit or base unit) that is part of said data collection system comprises a respective radio frequency element for communicating and exchanging data that defines a wireless data network, and over said wireless network the information, read by each portable unit in a use configuration is communicated to a respective base unit.

It should be noted that whilst each device can be in physical communication with any other device, in such systems it is known that each portable unit can communicate exclusively with a respective base, unit, in the sense that there is no provision for data exchanges between said portable units. In other words, each portable unit is associated with a respective base unit for data and command exchange.

In the industrial environment, over the years some international standards have been developed, such as, for example the Wi-Fi standard, which imposes physical requirements and data transmission specifications for using a wireless network. In particular, if single frequency is used for performing the transmission channel, the standard 802.11 provides network using a carrier sense multiple access (CSMA) and algorithms are known, such as, for example the CSMA/CA (Carrier Sense Multiple Access/Collision Avoidance), to ensure that collisions are avoided between the various, devices (whether they be portable units or base units) that are part of the wireless network.

The CSMA/CA algorithm provides for each device that wants to start a transmission listening to the channel (Listen-before-Transmit). If the channel is busy, the device generates a random number and associates a wait time therewith (known as the backoff time) that identifies the instant of time in which the device performs a transmission attempt.

A known problem of the CSMA/CA algorithm consists of the fact that as each devise of the network is asynchronous compared with others, although each device provides said random backoff time in the case of a busy channel, there is the probability that two devices transmit data simultaneously, generating interference on the transmission channel that makes correct reception of the data impossible, and above all, requires the transmission to, be repeated.

The phenomenon of interference is obviously greater the greater the throughput of the network and this typically occurs with a large number of devices present in the wireless network or with data packets of large size. In fact, as the transmission of a packet is delayed by the backoff time, the probability of two devices transmitting simultaneously increases with the throughput of the network. Further, recently, ever more sophisticated portable units have appeared on the market that are able to acquire even more evolved optical information, such as, for example, photographs. This information, when transferred to the respective base unit, generates very high throughput on the wireless network so as to increase the interference on the transmission channel so as to make the network unusable even with very few portable units communicating on the same wireless network.

The applications connected to the use of portable units in an industrial environment, or to applications of commercial type, are used increasingly so that installing complex wireless networks is very frequent in which the presence of a plurality of bases, or even of radio access points, connected in a network to one another is used to enable very wide work areas to communicate. Each base unit or each radio access point has an antenna of a given power that defines, as known, a cell, of a lesser dimension than the total work area of the wireless network and it is therefore necessary for each portable unit, which may be in a position of the work area in which several cells are located, to choose during a movement and in function of its position, with which of the base units present to be associated.

This functionality of the portable units in a wireless network is called "roaming" and typically the portable unit defines the presence of a possible base unit to use for "roaming", detecting a physical parameter of the radio signal coming from the base.

It is known to use the intensity of the radio signal as a criterion for conducting roaming on a base unit of the set of base units present, in particular by choosing the base from which the radio signal with the greatest intensity comes. If said radio signal is above a threshold value, the base from which the signal comes is considered to be present and usable for roaming.

The choice of the intensity of the radio signal as a physical parameter for enabling a portable unit to identify whether a base unit is, in general, present, or to choose a base unit for roaming, nevertheless raises numerous problems.

In particular, if several various wireless networks are present simultaneously, a radio signal coming from a base near the portable unit could be very intense but also very noisy, in fact making communication with said base impossible. Consequently, in the presence of several base units, said portable unit could erroneously associate itself with a base unit with which communication is difficult.

The object of the present invention is to improve communication in wireless networks of known type, based on the CSMA/CA technique, in particular optimising the use of the transmission channel of a wireless network based on the CSMA/CA technique, trying to avoid transmission interference as much as possible.

Another object is to improve communication in wireless networks of known type, assessing the efficiency of the communication.

A further object is to obtain a communication method in wireless networks in which the efficiency of communication is assessed on the basis of a criterion that is independent of specific physical parameters, so as to be immune to disturbances even in the presence of very crowded known wireless networks.

In a first aspect of the invention, there is provided a method for performing wireless communication in a data-collection system, according to claim 1.

Owing to this first aspect, it is possible to devise a communication method that enables each device on the network to be synchronised with the others to minimise transmission interference, even if a signal indicating a common, shared time is not available on the wireless network. In particular, each device that wishes to transmit but cannot because the channel is already busy, calculates a variable interval of time that indicates the moment at which the channel will become free again and waits for this time before queuing for a further wait time obtained from generating a random number, as required by the CSMA/CA protocol. In this manner, all the devices that are ready for transmission will await the end of the previous transmission and simultaneously, subsequently, will wait for said further wait time. Consequently, a collision will occur only if two different devices generate the same further wait time inasmuch as each device will start to transmit in a manner that is staggered over time compared with the others.

In a second aspect of the invention, a method is provided for creating wireless communication in a data-collection system, according to claim 12.

Owing to this second aspect, it is possible to make a communication method that enables an objective assessment to be made of the presence in the network of a data-packet sender device.

In fact, by monitoring the transmission channel, processing a monitored physical signal to assess whether said packet is corrupted or not and by performing further processing in case this packet is not corrupted, it is possible to identify as being present in the network only a device, which is the sender of the monitored packet, the transmission of which is not disturbed. In fact, processing said physical signal, in addition to contributing to demodulating the physical radio signal, enables it to assess whether a packet corresponds to said physical radio signal, said physical signal being compatible therewith, or whether, on the other hand, the physical signal is spurious, or corrupted.

BRIEF DESCRIPTION OF THE DRAWINGS

The invention can be better understood and implemented with reference to the attached drawings, which illustrate some embodiments thereof by way of non-limiting example, in which.

DETAILED DESCRIPTION

Figure 1:
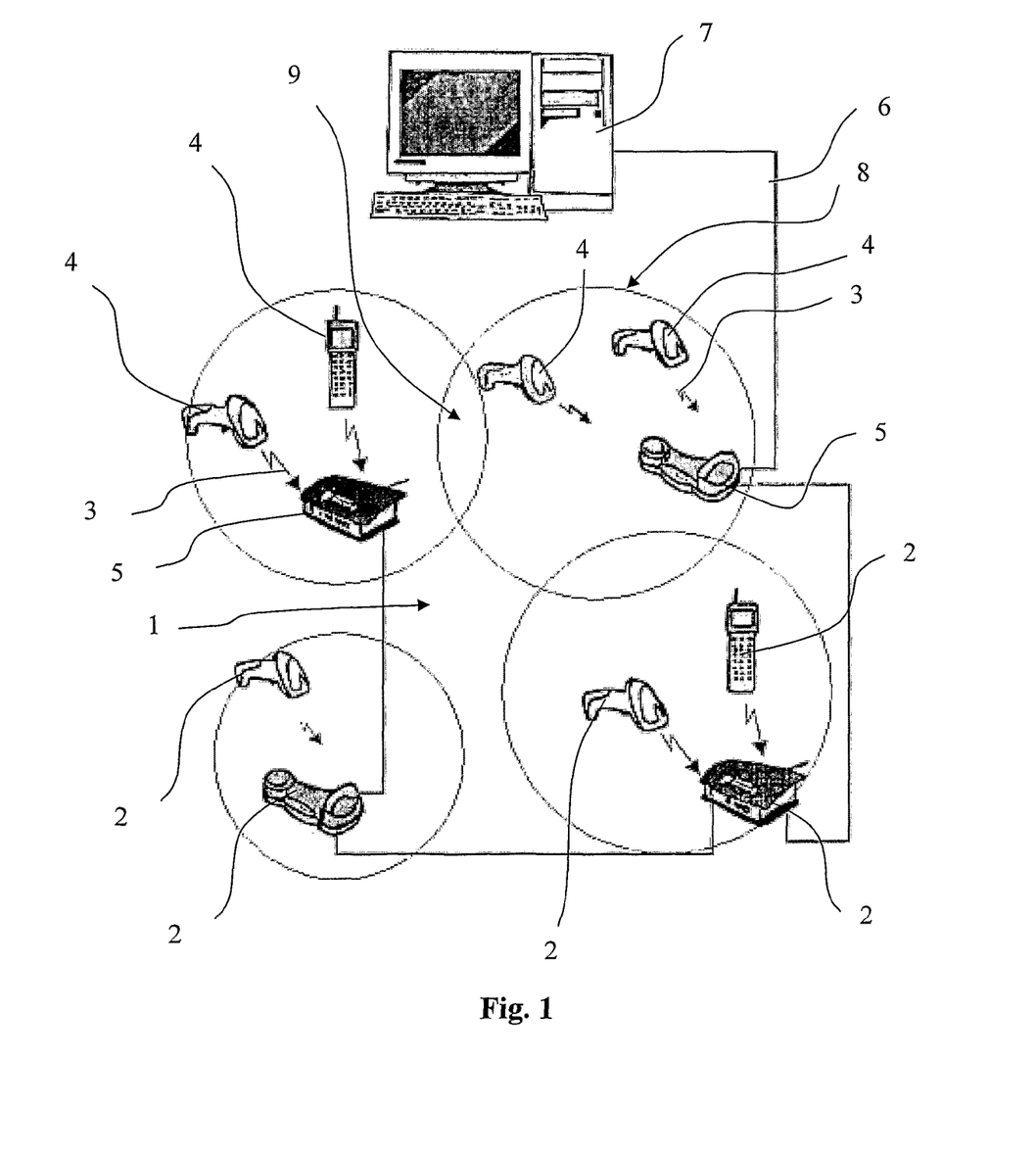
FIG. 1 is a simplified diagram that illustrates the communication system of the present invention.

FIG. 1 illustrates a data-collection apparatus comprising a data collection system 1. The data collection system 1 comprises a plurality of devices 2 that communicate with one another over a first wireless network 3, to cover heterogeneous zones or a prefixed area of territory. Said devices comprise portable data-collection units 4 (known hereinafter for the sake of brevity as portable units) and base units 5. Each portable unit 4, although it communicates on the wireless network with every other portable unit 4 and with every other base unit 5, is associated exclusively with just one base unit 5 and not with other portable units 4, in order to exchange data and/or commands.

It should be noted that the terms "communicating" or "linked" have indicated and will indicate below in the description and in the claims the possibility of exchanging data between devices 2 that are in direct electrical contact or that are part of the same network, namely devices 2 that share the same physical transmitting means, such as, for example the first wireless network 3.

On the other hand, the terms "being associated" or "connected" have indicated and will indicate below in the description and in the claims the possibility of exchanging data between devices 2 that cooperate with one another at the logical level, being either in electrical contact in the same physical transmission means, or even in different networks or linked via the Internet.

The data-collection apparatus further comprises a second data network 6 and at least a data-collection and possibly data-processing host computer 7. Each base unit 5, in addition to communicating over the first wireless network 3 with a plurality of portable units 4, is able to communicate with other base units 5 over a second data network 6, which links said base units 5 to said data-processing and collection computer 7. It should be noted that the second network 6 has a prefixed domain address, or, in general, a set of network domain addresses. Each network domain contains at least one of said base units and each portable unit is associable only with a single prefixed domain, namely with one of the base units that is part of its own network domain.

The data-collection computer 7 performs the function of collecting the data acquired by each portable unit 4 and of coordinating the portable units 4. The data-collection computer 7 is therefore not linked to the first data network wireless 3, inasmuch as said data-collection computer 7 is typically an office computer or a data server that may be resident in the same building as the first wireless network 3, but also be positioned at a distance and communicating over Internet. Typically, the data-collection computer 7 interfaces with company management applications.

Each base unit 5 defines a radio-coverage cell 8, namely a determined environmental area inside which the radio signal of the base unit is "present". It should be noted that each portable unit 4 inside the cell 8 will judge the base unit 5 to be "present" according to the method of assessment of the efficiency of the communication of the present invention. Each portable unit will send the acquired data to the base unit which will communicate the acquired data, with the methods illustrated below, to the data-collection computer 7 over the second network 6.

As illustrated in FIG. 1, the data collection system 1 comprises a plurality of coverage cells 8 defined by respective base units 5, which define one or more common environmental areas 9, in which several coverage cells 8 are active, of respective base units 5. If the portable unit 4 is inside a single coverage cell 8 defined by a single base unit 5, the portable unit will be associated with said single base units 5. If, on the other hand, the portable unit 4 is in one of these common areas 9 and is simultaneously communicating with several different base units 5, the portable unit 4 stores internally in a dedicated storage list all the base units 5 present. The manner in which the portable unit chooses one of the base units 5 to be associated in connection will be illustrated below.

As shown in FIG. 1, the portable units 4 can be of various types. In particular, each portable unit can be a PDT (portable data terminal), i.e. a portable data terminal for the automatic or manual acquisition of data or can be a simpler data-reading unit that is in general graspable by an operator to read optical information, for example barcodes. Each portable unit may comprise a screen and/or a keyboard and/or status LED, for interacting with an operator. Each portable unit further comprises a software programme that is resident, preloaded or stored in the portable unit to implement the communication method of the present invention. The term portable unit 4 means below, in this description and in the claims, any type of portable data-collection unit of interest.

As shown in FIG. 1, the base units 5 can be of various types. In particular, each base unit may comprise electric contact elements, which are of known type and are not illustrated, that are intended for interacting with respective electric contact elements, which are of known type and are not illustrated, of the portable unit 4. When the portable unit 4 is positioned in such a way as to engage with a respective base unit 5, this base unit 5 performs the function of supporting the portable unit and of loading, by means of said electric contact elements, a battery with which the portable unit 4 is equipped. The base unit 5 may further comprise further electric contact elements, which are not illustrated, that are intended to interact, when the portable unit 4 is positioned so as to engage with a respective base unit 5, with respective further electric contact elements, which are not illustrated, of the portable unit 4 for exchanging data between the portable unit 5 and the base unit 5. The contact between the electric contact elements of the portable unit 4 and the respective electric contact elements of the respective base unit 5 and the contact between the further electric contact elements of the portable unit 4 and the respective further electric contact elements of the respective base unit 5 enables the portable unit 4 and the base unit 5 to be placed in contact, also when communication over the first wireless network 3 has not yet been established, as will be disclosed below. Alternatively, each base unit may be devoid of both electric contact elements and of further electric contact elements and have exclusively the possibility of communicating via said first network 3 and said second network 6, performing the function of point of access for the wireless network 3. Each base unit further comprises a software programme that is resident, preloaded or stored in the base unit to actuate the communication method of the present invention.

The term base unit 5 will mean below, in this description and in the claims, any type of base unit of interest.

The first network 3 is a radio frequency wireless network, operating at the frequency of 433.92 MHz and having a transmission speed of 19.2 BAUD, which conforms to European standard ETSI EN300 and for which a typical value of the dimension of the radio coverage, cell, in the absence of particular obstacles due to the environment, is equal to 50 meters. Alternatively, a frequency of 910 MHz and a transmission speed equal to 36.8 BAUD can be used, this not corresponding to a European standard, but being usable in other geographical areas. Lastly, another possibility is the use of a frequency of 868 MHz, which is also compatible with the standard ETSI EN300.

Access to the single channel radio by all the devices 2 communicating via the first network 3 occurs according to the protocol CSMA/CA according to the invention, which will be illustrated below, and each wireless device 2 has in said first network 3 a respective address that identifies the wireless device 2 for the purposes of data exchange.

Communication between the devices 2 of said first network 3 can be of the point to point bidirectional type or of the point-multipoint mono-directional type and each type of communication provides for an information packet of different type. Although different types of information packets are provided, each packet has a final portion, identifying the end of the packet.

Figure 2:
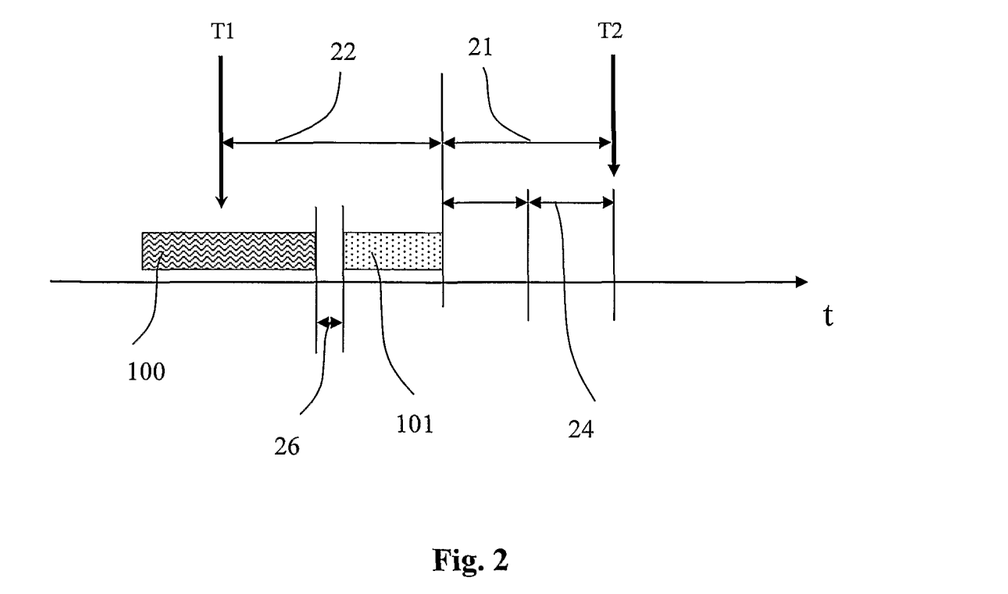
FIG. 2 is a simplified diagram that illustrates the transmission of a data message and of a respective acknowledgement message in the wireless network.

In particular, said bidirectional point-to-point communication provides for two types of information packets, as illustrated in FIG. 2, and comprises the exchange of data packets 100 (DATA) that are transmittable both from portable units 4 and from a base unit, and each data packet (DATA) transmitted by a sender to a receiver is followed by an acknowledgement packet 101 (ACK) from said receiver to said sender. In other words, the sender must always wait for an acknowledgement packet 101 (ACK) before considering the transmission to be concluded. It should be noted that said communication is bidirectional, inasmuch as asynchronously both each portable unit 4 and each base unit 5 can take the initiative of initiating a data transmission to a receiver device 2 of interest. As, as said previously, each portable unit 4 is associable exclusively with a base unit 5, there will be no data packets 100 (DATA) mutually exchanged between said portable units but only between a portable unit 4 and a base unit 5.

Said mono-directional point-multipoint communication comprises the exchange of a further type of packet, i.e. comprises the exchange of status packets (BEACON), that are transmittable exclusively by said base units 5. In absence of activities of said base unit 5 on said single channel, each base unit 5 transmits status packets (BEACON), identifying the base unit 5. Each status packet comprises status information on the base sender, which is usable as will be clear below, by said portable units 4. The status packet (BEACON) is transmitted to all the devices 2 in said first network and in this case the transmission is called MULTICAST transmission. In some particular situations, the status packet can be sent to all the devices 2 present, not necessarily being part of said first network 3, and in this case the transmission is said to be of BROADCAST type. The status packet, to avoid interference on the transmission channel, does not require the receiving devices 2 on said channel to send an acknowledgement packet (ACK).

The second data network 6 is on the other hand a multipoint network, such as, for example, a cable serial network RS485 that can alternatively also be an Ethernet network or also a commercial wireless network.

The data-collection computer 7 comprises at least a first data management application that, in order to acquire data from or send data to a prefixed portable unit 4 in the set of portable units available in the wireless network, communicates with a second data management application that is part of the portable unit 4. In particular, each portable unit 4 comprises at least said second data management application, further to other specific management applications of the operator interface (if present) or of data acquisition.

Communication between the first application and the second data management application is a point-to-point bidirectional communication inasmuch as in asynchronous mode both each portable unit 4 and said data-collection computer 7 can take the initiative to initiate a data transmission to a receiver device 2 of interest.

In particular, said bidirectional point-to-point communication comprises logically associating said first application and said second application by at least a communication session, that comprises a complex exchange of data and/or commands, namely data transactions, which may be of different type.

The data-collection computer 7 opens a communication session with the portable unit 4 to send a display command of a data string with a particular meaning or graphic image/icon in order to warn the operator using the portable unit of an unexpected activity of the data collection system 7 (such as, for example, "Warning! Data-collection computer shutting down!"). This command could also compel the operator to perform an acknowledgement operation that the command has been run or received. A different communication session provides for the data-collection computer setting a new value for each internal configuration parameter of the portable unit that is able to operate said portable unit in a different manner. Each portable unit 4 on the other hand opens a communication session with the data-collection computer 7 when it has to transfer the data acquired by the operator using the portable unit or when it requires data residing in the same data-collection computer 7.

Each transaction comprises, in general, an exchange of messages between said computer 7 and said portable unit 4. It should be noted that each message does not normally correspond to the packet exchanged in the first network 3 between each portable unit 4 and the base unit 4 associated therewith inasmuch as typically a message is of a dimension that is much greater than the dimension of a packet and further contains complex information contents referring to the communication session to which it belongs. Thus, in known mode, each message is transformed into a plurality of data packets (DATA) 100 and acknowledgement packets (ACK) 101 exchanged in said first data network 3 between said portable unit 4 and said base 5 and into a plurality of further data packets and further acknowledgement packets exchanged in said second data network 6 between said base and said data-collection computer 7.

The communication session between the first and the second data management application offers different communication service levels, which are associated with respective types of transaction. It may in fact be requested, by a sender that opens the same communication session at different moments, that said communication session, for the same data information transferred, be initially conducted so as to ensure maximum reliability and subsequently so as to ensure maximum speed. The maximum-reliability communication session provides for each message transmitted by the application sender being followed by an acknowledgement message from the application receiver. The maximum-speed communication session does not provide for acknowledgement messages and the transmission guarantee is entrusted exclusively to the packets and to the further packets exchanged respectively in the first data network 3 and in the second data network 4.

The communication session thus offers different levels of service, each service level being associated with a transaction of a preset type.

A transaction of the first type provides for each data message (MSGDATA) transmitted not being followed by any acknowledgement message (MSGACK), i.e. provides for the sender transmitting a message without waiting for a respective acknowledgement message (MSGACK) acknowledging said data message. A transaction of the first type is very quick but the sender does not have the certainty that the receiver has received the message of the sender. A transaction of this type is typically used when an operator using a portable unit 4 has to acquire many data from the field very rapidly.

A transaction of the second type provides for transmitting at least one data message (MSGDATA) and awaiting a respective acknowledgement message (MSGACK). A transaction of the second type is slow but very reliable inasmuch as the sender has the certainty that the receiver has received and processed the message of the sender. A transaction of this type is typically used to send commands from the data-collection computer to an operator using a portable unit 4 or when an operator makes a request to the data-collection computer 7 about, for example, the availability of an item in the warehouse.

The data-collection apparatus further comprises a third data management application, which is part of each base unit 5 or alternatively of just one of the base units 5 of the second network 6, the third application being connected to the first application of the data-collection computer 7 over the second network 6 and to the second application of a portable unit 4 over the first network 3.

The third data-collection application also performs some of the logic functions of the first application, in the sense that said communication session can be established between said base unit 5 and said portable unit 4, for some types of transaction and between said first application and said second application for others. This enables flexibility of use for the data-collection apparatus, in certain particular operating situations.

In particular, a transaction of the third type provides for transmitting at least one data message (MSGDATA) from a portable unit 4 and waiting for a acknowledgement base message (MSG BASE ACK) from said third application which transmits said acknowledgement base message (MSG BASE ACK) when it has correctly received said data message (MSGDATA). A transaction of the third type is quite quick and the sender has the certainty that said base unit 5 has received the message without, however, having the certainty that the receiver has received the message. A transaction of this type is typically used when an operator using a portable unit 4 has to acquire rapidly many data from the field and wishes to have confirmation that they have been received by the associated base unit.

A transaction of the fourth type provides for transmitting at least one data message (MSGDATA) by a portable unit 4 and waiting for a transmission acknowledgement base message (MSG BASE TX ACK) from said third application, which transmits said transmission acknowledgement base message (MSG BASE TX ACK) when it has correctly transmitted said data message (MSGDATA) to receiver. A transaction of the fourth type is faster than a transaction of the second type and fairly reliable, inasmuch as the sender has the certainty that the receiver has received the message. A transaction of this type is typically used when an operator using a portable unit 4 has to acquire many data from the field and at the same time wants confirmation that the data have been successfully sent to the data-collection computer 7.

In an alternative embodiment that is not shown, the data-collection computer 7 is not present inasmuch as the data-collection function is performed by one of the base units 5 in the second network 6, which also performs the function of a data concentrator. It is precisely for this reason that the data-collection computer 7 or said concentrating base unit 5 can be generally considered to be data collection and processing elements. It should be noted that if said data-collection computer is absent, said concentrating base unit comprises both said first data-collection application and said third data-collection application.

Each data message (MSGDATA) comprises a data portion suitable for indicating to the receiver the type of transaction to which the message belongs and in this manner each communication session can be set at a respective service level. When the sender opens a transaction, he fill in said data portion in the first data message (MSGDATA) of the transaction with the type of transaction to which the message belongs and in this manner the receiver can identify the type of transaction and the type of acknowledgement message (MSGACK) or acknowledgement base message (MSG BASE ACK) or transmission acknowledgement base message (MSG BASE TX ACK) required.

In an alternative embodiment that is not shown, any two devices 2 communicating on the wireless network 3 can be associated temporarily with one another in order to exchange data. In particular, each portable unit 4, can, for example, be temporarily associated with another portable unit 4, in order to enable an operator using a portable unit to send data to a different portable unit used by another operator. For example, this function could enable an exchange of service messages between two portable units 4 to take place if, for example, the respective base units 5 associated with said portable units 4 and the entire second data network 6 were out of order.

In use, each device 2 communicating on the first network 3 that wants to transmit a packet in a preset instant of time T1, either said packet is a data packet 100 (DATA) or a status packet (BEACON), checks whether the transmission channel is free or busy (Listen-before-Transmit) and if the channel is free, transmits in the manner illustrated below. If, on the other hand, the channel is busy, the CSMA/CA protocol for access to the channel provides for collisions having to be avoided by generating a random number and associating with said random number a first interval of time 21 to determine a transmission start instant T2.

The device, which continuously monitors the data exchanged in said channel by the other devices occupying the channel, as it knows the information packets exchanged between devices 2, is able to identify a second interval of time 22 in which the channel will remain in busy status. Although the packet is exchanged on the first data network 3 with a packet of variable length, the device 2 waits for the portion indicating the end of the packet to be monitored and only at the moment in which it determines the end of the transmission occupying the transmission channel does it wait for a third interval of time 23 obtained from said first interval of time 21.

As already said, the first interval of time 21 is obtained by generating a random number that is associated to said first interval of time. It should be noted that said first interval of time 21 is obtained by multiplying said random number by a fourth interval of time 24 to identify instants of time that are staggered between themselves in which said transmission is possible. Said fourth interval of time 24 is chosen in a suitable manner to minimise the risk of possible interference of two waiting devices and is equal to the duration of the data packet of minimum dimension exchanged between said devices.

In fact, if the channel is already busy, as illustrated in FIG. 2, the first interval of time 21 generated in a random manner is queued onto the second interval of variable time 22. In this case the third interval of time 23 and the first interval of time 21 coincide. In other words, the device 2, that in a given instant T1 wishes to attempt a transmission, starts the transmission in an instant of time T2 that is delayed with respect to T1 by the sum of the first interval of time 21 and of the second interval of time 22.

Figure 3:
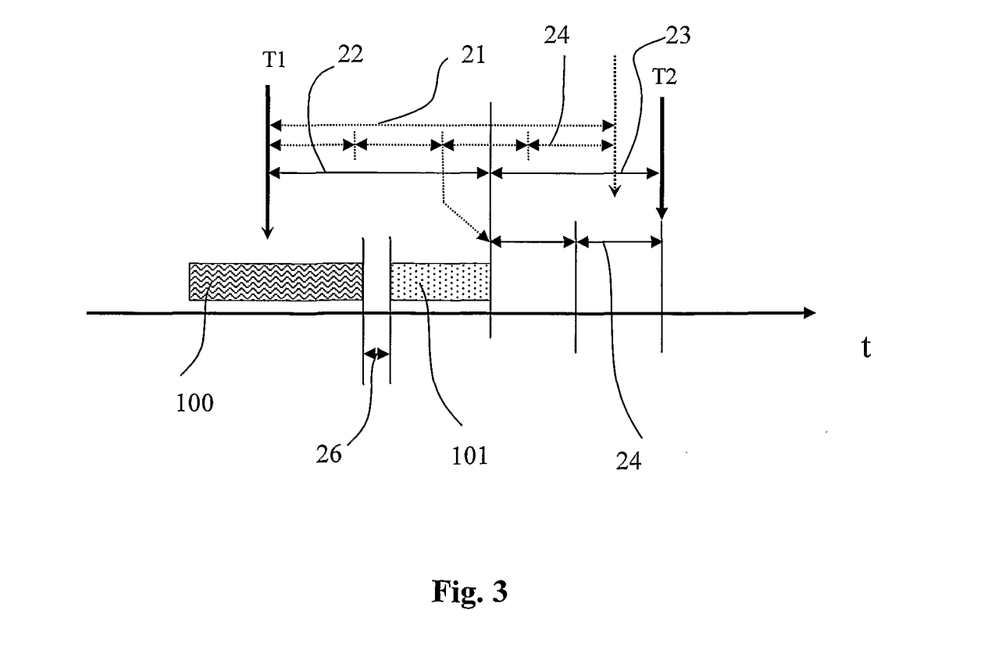
FIG. 3 is a simplified diagram that illustrates a further transmission method for a data message and a respective acknowledgement message in the wireless network.

In an alternative embodiment shown in FIG. 3, the first interval of time 21 generated at random is made to start at the instant of time T1 in which the device 2 desires to attempt a transmission and the third interval of time 23 is obtained from the first interval of time 21 by considering the difference between the end instant of time of said first interval of time and the end instant of time of said second interval of time. Said difference, rounded off (up or down according to need) so that it is a multiple of said fourth interval of time, is equal to said third interval of time 23. The device 2, which at a given instant T1 desires to attempt a transmission, starts transmitting at an instant of time T2 that is delayed with respect to T1 of the sum of the third interval of time 23 and of the second interval of time 22.

In particular, if the transmission channel is busy, each device that at a given instant T1 desires to attempt a transmission, still monitoring exchanged packets on said first network 3 and already knowing the type of packet occupying the channel having already decoded the packet, already knows the type of communication in progress due to the other devices 2 occupying the channel. If the monitoring device 2 recognises the packet exchanged between the devices 2 occupying the channel as a data packet 100 (DATA), as the communication on the first network 3 provides for each transmitted data packet 100 (DATA) being followed by an acknowledgement packet 101 (ACK), the second interval of time 22 will be the same as the time necessary for transmitting not only the data packet 100 but also the acknowledgement packet 101 (ACK). If the monitoring device 2 recognises on the other hand the packet exchanged between the devices 2 occupying the channel as an acknowledgement packet (ACK) 101, the second interval of time 22 will be the same as the time necessary for transmitting only the acknowledgement packet (ACK) 101. If the monitoring device 2 on the other hand recognises the packet exchanged between the devices 2 occupying the channel as a status packet (BEACON), the second interval of time 22 will be the same as the time that is necessary for transmitting only the status packet (BEACON), the latter not requiring any acknowledgement packet (ACK).

It should be noted that there is a non-zero time, the so-called TURNAROUND TIME 26 between when a device 2 receives a data packet and the instant at which the transmission of an acknowledgement packet (ACK) occurs. In order to prevent the channel being erroneously considered to be free, the channel is considered to be free if for a fifth interval of time no activity is monitored in said channel. The fifth interval of time is greater than the TURNAROUND time 26.

Further, in order to avoid interferences, transmission in the case of a channel estimated to be free can be achieved by generating a further random number and associating, a sixth interval of time therewith that is a multiple of a seventh interval of time that can be, for example, of the same duration as said fourth interval of time 24.

This CSMA/CA protocol modified according to the invention offers numerous advantages. Above all, synchronised transmission of all the devices that wish to transmit is ensured as each device will await the end of the present communication on the transmission channel, before awaiting said third interval of time to transmit. The end of the packet transmission occupying the channel thus defines "a zero instant" that is common to all the devices in the first network 3 that wish to transmit, that enables the devices 2 to be synchronised although the first network 3 does not comprise a common shared time signal and although each device 2 is asynchronous with respect to the others. This clearly lessens the probability that a transmission on the transmission channel will generate interference. Otherwise, each device 2 will start to transmit in a manner that is staggered with respect to the others. Further, as said fourth interval of time 24 has been chosen in a suitable manner, each waiting device 2 will start a transmission aligned on the time at the start of an interval 24.

In use, each device 2 determines the efficiency of communication in the transmission channel of said first wireless network 3, wherein access to said channel is based on a Carrier Sense Multiple Access (CSMA) data-transmission technique and in which data communication between said devices provides for transmitting data packets. The device 2 in fact provides for continuous monitoring of the channel when said channel is busy and processes the physical radio signal monitored in said channel so as to assess whether a packet corresponds to said physical signal or whether the physical signal has been corrupted. If said physical signal is not corrupted and on the other hand corresponds to what is expected, the monitored packet is decoded to identify the device 2 sending the packet. Processing the physical signal and the monitored packet assesses the efficiency of the communication towards the device 2 sending the packet, i.e. identifies whether said device is present in said first network 3.

In particular, processing the monitored physical signal comprises applying a statistical correlation to the signal, which comprises comparing the shape of the rising and/or falling edge of said signal with a reference signal, to assess whether said physical signal has a shape that is compatible with a bit sequence or is on the other hand a spurious or corrupted signal.

Further, said processing comprises comparing the frequency of the rising and/or falling edges of said signal with the set transmission frequency (BAUD RATE) of the system, to assess whether said physical signal has a frequency that is compatible with a bit sequence, or whether it is on the other hand a spurious signal. A physical signal with rising and/or falling edges that are too close, too far and/or irregular will be ignored inasmuch as too "dissimilar" from a valid signal and the signal will be assessed as spurious, i.e. corrupted.

If the monitored physical signal is not corrupted, the packet is further decoded to identify the device 2 sending the packet. Further, the data content of the packet is analysed, i.e. to ascertain whether the type of packet and data contained therein, i.e. the shape of the packet, are those expected. In other words, the shape of the monitored packet is compared with a reference packet.

At the end of identification of the sender device, if fast processing is necessary, or at the end of identification of the sender device and at the end of processing the shape of the packet, the device 2 sending the monitored packet is considered to be present in said first network 3 if said monitored signal is not corrupted and if the shape of said monitored packet corresponds to that of said reference packet. The efficiency of said communication channel is thus assessed by using exclusively the information content of the monitored packet.

This method for assessing the efficiency of communication in a wireless network has numerous advantages.

If should in fact be emphasised that by not using the intensity of the physical radio signal to assess the presence or absence of a network device, it is possible to detect correctly the presence of a network device 2, even if the physical radio signal is received at very low power at the sensitivity limit of the radio.

In fact, processing said physical signal, together with comparing the shape and/or the frequency of the rising and/or falling edges of the physical radio signal monitored in said channel, enables a contribution to the demodulating of the physical radio signal to be made by producing a digital signal that is suitable for subsequent decoding and further enables it to be assessed whether a packet corresponds to said physical radio signal inasmuch as said packet is compatible therewith or whether the physical signal is spurious, or corrupted.

Further, a device is assessed as being present in the network the transmitted decoded data of which are compared with a reference packet, and thus there is the certainty that said device 2 is in the network.

The communication method, which enables interference in the transmission channel to be avoided, and the method for assessing the efficiency of the communication, can be advantageously used singularly or in combination.

The method for assessing the efficiency of communication is advantageously used by a portable unit 4 if the operator using the portable unit 4 is in a common environmental area 9 in which several coverage cells 8 of respective bases 5 are simultaneously active and the portable unit 4 is thus associable with different base units 5.

Each portable unit 4 of the base determines which to associate itself with in a different manner according to whether the portable unit is in a first operating configuration, which follows the initialisation of the portable unit 4 at first use thereof, or whether it is in a second operating configuration, i.e. whether the portable unit has already been operational for some time.

At first use, the portable unit 4 has to be initialised in terms of the physical identification addresses (Medium Access Control or MAC Address) of said first data network 3, i.e. the address of at least a base unit and the address of the network domain to which said base unit belongs. There are different methods to ensure that the aforesaid addresses are communicated to the portable unit 4.

In the presence of a base unit 5 comprising contacts and further contacts, such as, for example, a base unit that is able to charge the battery of a portable unit 4, arranging the respective interfaces in contact with said portable unit and said base unit 5, the portable unit 4 reads automatically from the base unit 5 the address of said base unit 5 and the address of the domain to which said base unit belongs and communicates to the base unit 5 its own identifying address found in the memory. Alternatively, an operator command, such as, for example, pressing a dedicated button in the base unit 5, if the respective contact interfaces of said portable unit 4 and of said base unit 5 are arranged in contact, can force the portable unit 4 to read the aforesaid addresses, communicating at the same time its own address thereof to said base unit 5.

Alternatively, an operator can force the portable unit 4 to read the aforesaid addresses on respective external codes, such as, for example, dedicated barcodes.

Alternatively, at the first use or also when a command of the data-collection computer 7 is received or following the reading of a dedicated barcode, the portable unit set itself in a wait status configuration.

Similarly also one of the base units 5 belonging to the network domain for which the portable unit is intended, by means of a command of the data-collection computer 7 or of an operator, is set in wait status configuration. In this status said base unit 5 sends the address thereof and the address of the domain thereof. The portable unit 4 transmits the address to the base unit 5, thus concluding initialisation.

The portable unit 4 stores said addresses internally, i.e. the address of said base unit 5 and the address of the domain to which said base unit 5 belongs, in a permanent area of the memory. From this moment on, the portable unit 4 is able to communicate in said first wireless network 3.

At the end of initialization, in the first operating configuration, the portable unit is associated in connection with the base unit 5 the address of which it has initialised during initialization. From this moment on, the portable unit 4 can be used by an operator and is in a second operating configuration in which, in order to transfer the acquired data, it exchanges data packets 100 and respective acknowledgement packets 101 with said base unit.

In said second operating configuration, if the portable unit 4 has stored a network domain address, the portable unit 4 builds in a dynamic manner a list of base unit 5 addresses with which it is associable, adding to said list a base unit with which communication is judged to be present and eliminating from said list a base unit with which the communication is judged to be absent, or possibly maintaining the base unit on the list and marking said base unit as absent.

Each portable unit 4 is associated to a different base unit found in the list if the base unit with which it is associated becomes absent. The criterion according to which each portable unit chooses with which of the bases on said list to associate itself can be a very simple criterion, for example linked to the first base unit judged to be present or, alternatively, can be a more complex criterion, for example linked to the base unit with few portable units connected, as explained below.

By using the method of the invention to assess the efficiency of the communication, each portable unit 4 is able to judge, without errors a base unit 5 as being associable, although a very weak radio signal comes from it. It should be noted that, as already said previously, each portable unit 4 monitors the channel and is able to assess whether other devices 2, in particular base units 5 are present in said first network 3, adding said devices 2 to the list of the present base units.

It needs to be specified that if the portable unit 4 has not stored a network domain address because the wireless network provides a sole base unit 5, in said second operating configuration said portable unit will always be associated with the sole base unit 5 that is present.

Each base unit 5 in the absence of another activity on said channel, periodically transmits status packets (BEACON) identifying the base unit 5, which are used by each portable unit 4 to update said list of associable base units 5. Accordingly, if the portable unit 4 no longer receives than data packets (DATA) or status packets (BEACON) from a base unit 5 for a given period of time, the portable unit 4 can consider the base unit 5 to be absent, eliminating the base unit 5 from the list of the bases that are associable or possibly maintaining the base unit 5 on the list but marking the status thereof as absent. For example, during a movement an operator could be passed from a first coverage cell 8 to a second coverage cell 8.

Each status packet comprises various types of information status of the sender base unit 5 that each portable unit 4 uses in order to construct said list of associable base units 5.

A first type of status information defines the availability of the base unit 5 from which the packet comes to associate itself with further portable units. When a base unit 5 reaches, for example, a large number of portable units 4 associated therewith, equal, for example, to a preset value, the status packet (BEACON) notifies all the portable units of the unavailability of the base unit 5 for further associations. Each portable unit 4 can thus eliminate said base unit 5 from the list of the associable base units or mark the status thereof as not available.

A further type of status information defines the number of portable units 4 already associated with said base unit 5 from which the packet comes. The status packet (BEACON) notifies all the portable units 4 that the base unit is busy and each portable unit 4, whilst inserting said base unit 5 into the list of the associable base units, can choose to be associated with the base unit 5 with fewer portable units 4 already connected.

A further type of status information defines a forced association command of a specific portable unit 4 with a base unit 5. A base unit 5 can, for example, send to a specific portable unit in its own coverage cell 8 thereof a forced association command that forces said portable unit to be associated with the requesting base unit 5 for a preset period of time.

A further type of status information intended for a specific portable unit 4 defines the transmission synchronisation status with said specific portable unit 4. As each data packet is distinguished by a counter in ascending order, i.e. by a number identifying the packet, if there are failed transmissions between said portable unit 4 and said base unit 5, the base unit 5 that is expecting the nth data packet 100 from said portable unit 4 may instead receive a different data packet.

Said base unit may, for example, require from said portable unit 4 synchronisation of packets identified by specific counters, if it understands that there has been a misalignment because of failed transmissions.

It should be noted that the data collection system 1 of the present invention, by using the communication method based on the CSMA/CA protocol modified according to the invention and the communication method for assessing the efficiency of the communication, together with the presence of status packets (BEACON) containing status information relating to the base unit sending the packet, is able to create a very efficient wireless network with low transmission interference and with the possibility of dividing the data traffic, in the presence of several base units, so as to optimise the data flow in the wireless network. Although the wireless network operates at relatively low transmission speeds, high transmission efficiency is ensured so as to make the wireless network suitable even in the presence of ever more sophisticated portable units that are able to acquire complex optical information.

What is claimed is:

1. A method for performing wireless communication in a data-collection system, said system comprising a plurality of devices communicating with one another over a single channel of a first data network, wherein access to said channel is based on a Carrier Sense Multiple Access (CSMA) data-transmission technique, said communication method in each of said devices comprising:

a) listening to whether said channel is free or busy and if channel is free, transmitting;

b) if the channel is busy, generating a random number and associating therewith a first interval of time to determine an instant to start transmitting;

said method further comprising the steps of:

if said channel is busy, identifying a second interval of variable time by monitoring data exchanged in said channel from other devices that occupy the channel;

and queuing a third interval of time obtained from said first interval of time onto said second interval of time and transmitting at an end of said third interval of time, said second interval of time being of a same duration as the time in which said channel remains in the busy state, wherein said first interval of time is obtained by multiplying said random number by a fourth interval of time, wherein said fourth interval of time is equal to a transmission time of the data packet of minimum dimension exchanged between said devices, wherein each device has a respective network address in said first data network, wherein said devices comprise a plurality of portable data-collection units and a plurality of base units, said base units being connected to one another by a second data network comprising a set of network domain addresses, each network domain grouping at least one of said base units, said method further comprising:

associating each portable unit with one of the base units that is part of a respective network domain, initializing each portable unit in said first data network, associating in a first operating configuration each portable unit with the base unit the address of which was stored during said initializing, and placing said base unit in communication with at least one data collection element by means of said second data network, wherein each portable unit comprises at least a first data management application and each data collection element comprises a second data management application, said method further comprising logically associating said first application and said second application by means of at least one communication session, said communication session comprising transactions of different type.

2. The method according to claim 1 wherein the communication between said devices includes transmitting a data packet and awaiting an acknowledgement packet in response to said data packet, said monitoring comprising identifying said acknowledgement packet, said second interval of time being used as to queue said third interval of time onto the end of the transmission of said acknowledgement packet.

3. The method according to claim 1 wherein the communication between said devices includes transmitting a data packet and waiting for an acknowledgement packet in response to said data packet, said monitoring comprising identifying said data packet, said second interval of time being such as to queue said third interval of time onto the end of the transmission of said data packet and of the respective acknowledgement packet.

4. The method according to claim 1 wherein the communication between said devices includes transmitting a status packet, said monitoring comprising identifying said status packet, said second interval of time being such as to queue said third interval of time onto the end of the transmission of said status packet.

5. The method according to claim 1 wherein said third interval of time is equal to said first interval of time.

6. The method according to claim 1, wherein said third interval of time is equal to the difference between an end instant of time of said first interval of time and an end instant of time of said second interval of time, said third interval of time being equal to said difference rounded off in order that said third interval of time is a multiple of said fourth interval of time.

7. The method according to claim 1 wherein said listening to whether said channel is free comprises monitoring said channel for a fifth interval of time, said channel being defined as free if for all of said fifth interval of time there is no activity in said channel.

8. The method according to claim 7 wherein said fifth interval of time is greater than an interval of time that elapses between an end of a transmission of a data packet and a start of a transmission of the respective acknowledgement packet.

9. The method according to claim 7, wherein said transmitting if said channel is free comprises generating a further random number, associating the further random number with a sixth interval of time and transmitting at the expiry of said sixth interval of time, said sixth interval of time being a multiple of a seventh interval of time.

10. The method according to claim 1, wherein said portable unit and at least one of said base units have respective contact interfaces, said initializing comprising placing in contact said portable unit and said base unit, said portable unit automatically reading and storing from said base unit the address of said base unit and of the domain to which said base unit belongs.

11. The method according to claim 1, wherein said portable unit and at least one of said base units have respective contact interfaces, said initializing comprising placing said portable unit and said base unit in contact and using a user command to make said portable unit read and store from said base unit the address of said base unit and of the domain to which said base unit belongs.

12. The method according to claim 1, wherein said initializing comprises forcing a user reading step, said portable unit reading and storing the address of said base unit and of the domain to which said base unit belongs, said addresses being coded on respective external codes.

13. The method according to claim 1, wherein said initializing comprises placing said portable unit and one of said base units in a wait status configuration, said portable unit receiving from said base unit and storing the address of said base unit and the address of the domain to which said base unit belongs during said wait status configuration.

14. The method according to claim 1, said method comprising updating, in a second operating configuration, in each portable unit, a list of base units that are associable with said portable unit.

15. The method according to claim 14, wherein said updating comprises adding to said list a base unit if the communication with said base unit is considered to be present and eliminating from said list a base unit, or marking the status thereof as absent, if said communication is considered to be absent.

16. The method according to claim 1, wherein said base unit, in the absence of activity of said base unit on said channel, transmits to said channel said status packet identifying the base unit, said status packet not requiring the transmission of an acknowledgement packet by the portable units on said channel.

17. The method according to claim 16 wherein said status packet comprises status information on said base unit that is usable by said portable data-collection units.

18. The method according to claim 17 wherein said status packet contains information defining the availability of the base unit to associate itself with further portable units.

19. The method according to claim 18, wherein said updating said list comprises adding to said list a base unit if said portable unit receives a status signal from said base unit wherein said base unit is available for being associated with further portable units and eliminating from said list a base unit or marking said base unit as not available if said base unit is not available for being associated with further portable units.

20. The method according to claim 14 wherein said method comprises further exchanging data packets and respective acknowledgement packets between each portable unit and the respective base unit associated therewith in said first operating configuration.

21. The method according to claim 20, wherein said method comprises associating, in said second operating configuration, said portable unit with a base unit that is found on said list, when said base unit associated with said first operating configuration is no longer found on said list of possible connections or when said portable unit is commanded to change the base unit associated therewith.

22. The method according to claim 1, wherein said transaction is of a first type and comprises transmitting at least one data message without awaiting a respective acknowledgement message from a respective receiver in response to said data message.

23. The method according to claim 1, wherein said transaction is of a second type and comprises transmitting at least one data message and waiting for a respective acknowledgement message to said data message.

24. The method according to claim 1, wherein each base unit comprises at least a third data management application, said method further comprising logically associating said first application and said third application and said third application and said second application.

25. The method according to claim 24 wherein said transaction is of a third type and comprises transmitting a data message and waiting for an acknowledgement base message from said third application, which transmits said acknowledgement base message when said data message has been correctly received.

26. The method according to claim 25 wherein said transaction is of a fourth type and comprises transmitting a data message and awaiting a transmission acknowledgement base message from said third application, which transmits said transmission acknowledgement base message when it has correctly transmitted said data message to the receiver.

27. The method according to claim 1, wherein said method comprises further offering different communication service levels, each level corresponding to a given speed and transmission reliability, each service level being associated with a transaction of a preset type.

28. The method according to claim 22 wherein each data message comprises a data portion suitable for indicating to the receiver the type of transaction to which the data message belongs, said method comprising initiating a subsequent transaction setting the type of data transaction, said setting comprising filling in said portion of the first data message transmitted in said subsequent transaction with the type of transaction.

29. The method according to claim 26, wherein said method comprises transforming each data message and/or said acknowledgement message and/or said base acknowledgement message and/or said transmission acknowledgement base message in a plurality of data packets and of acknowledgement packets exchanged in said first wireless data network between said portable units and said base unit and in a plurality of further data packets and further acknowledgement packets exchanged in said second data network.

* * * * *

UNITED STATES PATENT AND TRADEMARK OFFICE
CERTIFICATE OF CORRECTION

PATENT NO.        : 9,113,476 B2                         Page 1 of 1
APPLICATION NO.   : 13/320104
DATED             : August 18, 2015
INVENTOR(S)       : Pier Giorgio Peruzzi et al.

It is certified that error appears in the above-identified patent and that said Letters Patent is hereby corrected as shown below:

In the Claims,

In Claim 1, at Col. 14, Line 67: insert --"the"-- before "channel".

In Claim 2, at Col. 15, Line 48: delete "used" and substitute therefore --"such"--.

Signed and Sealed this
Twelfth Day of January, 2016

Michelle K. Lee
*Director of the United States Patent and Trademark Office*